United States Patent [19]

Germscheid

[11] 3,855,284

[45] Dec. 17, 1974

[54] PROCESS FOR THE MANUFACTURE OF PHOSPHONIC ACIDS AND PHOSPHONATES HAVING AT LEAST TWO PHOSPHORUS ATOMS

[75] Inventor: Hans Gunther Germscheid, Dusseldorf, Germany

[73] Assignee: Henkel & Cie GmbH, Dusseldorf-Holthausen, Germany

[22] Filed: July 28, 1971

[21] Appl. No.: 167,044

Related U.S. Application Data

[63] Continuation-in-part of Ser. No. 860,124, Sept. 22, 1969, abandoned, which is a continuation of Ser. No. 793,219, Jan. 10, 1969, abandoned, which is a continuation of Ser. No. 397,027, Sept. 16, 1964, abandoned.

[30] Foreign Application Priority Data

Nov. 2, 1963 Germany.............................. 50724

[52] U.S. Cl......... 260/502.4 A, 210/58, 260/501.15
[51] Int. Cl................................................. C07f g/38
[58] Field of Search.............................. 260/502.4 A

[56] References Cited
UNITED STATES PATENTS

3,551,480  12/1970  Germscheid et al......... 260/502.4 A

FOREIGN PATENTS OR APPLICATIONS

1,032,378  6/1966  Great Britain............... 260/502.4 A
1,148,552  5/1963  Germany..................... 260/502.4 A
1,194,852  6/1965  Germany..................... 260/502.4 A

*Primary Examiner*—Joseph E. Evans
*Attorney, Agent, or Firm*—Hammond & Littell

[57] ABSTRACT

A process for the manufacture of uniform, phosphonic compounds selected from the group consisting of phosphonic acids having at least two carbon atoms and at least two phosphorus atoms in their molecule and salts of said acids which consists essentially of the steps of acylating $PCl_3$ with an excess of acylating agents selected from the group consisting of aliphatic and aromatic carboxylic acids having at least two carbon atoms in their molecules in the presence of water or acylating phosphorous acid with an excess of acid chlorides or acid anhydrides of the above acids at elevated temperatures up to the reaction boiling point, cooling the reaction mixture to a temperature above 30°C and below the boiling point of the alcohol added and adding thereto an alcohol selected from the group consisting of methanol, ethanol, propanol, butanol and pentanol, said alcohol being added in amounts of from 1.1 to 20 times the stoichiometrical amount, calculated on said excess of acylating agent, maintaining the reaction mixture in the said temperature range for a time sufficient to form volatile components, and recovering said phosphonic compounds free from impurities.

2 Claims, No Drawings

PROCESS FOR THE MANUFACTURE OF PHOSPHONIC ACIDS AND PHOSPHONATES HAVING AT LEAST TWO PHOSPHORUS ATOMS

REFERENCE TO OTHER APPLICATIONS

This application is a continuation-in-part of my co-pending application Ser. No. 860,124, filed Sept. 22, 1969, now abandoned which in turn is a "streamlined" continuation of Ser. No. 793,219, filed Jan. 10, 1969, and now abandoned, which in turn is a "streamlined" continuation of Ser. No. 397,027, filed Sept. 16, 1964, now abandoned.

THE PRIOR ART

A number of processes are known for the production of organic acylation products of phosphorous acid. For instance, this acid may be reacted with carboxylic acid chlorides, carboxylic acid anhydrides, or with mixtures thereof, to manufacture such substances. In order to obtain good yields, it has been found opportune to use an excess of the acylating agent, i.e., generally 1 to 2 mols acylating agent are employed per mol phosphorous acid. In lieu of carboxylic acid chlorides and phosphorous acid, phosphorus trichloride, water and carboxylic acids may be employed in suitable stoichiometrical quantities, again with an excess of the acylating agent.

In all these manufacturing processes hitherto known, mixtures of different compounds frequently are obtained whose constitution is not entirely certain as yet. Chromatographical investigation has shown that at times quite complicated mixtures are at hand. Many of the mixtures are in the form of oils when isolated. If these products are converted into their respective salts, hydroscopic materials usually are obtained even after spray-drying.

The manufacture of uniform materials from the reaction mixtures is feasible either by a comparatively involved crystallizing process which suffers from the drawback of high losses or else by a treatment of the reaction mixture with water at elevated temperatures and, if required, distillation of volatiles. The latter process leads to uniform products in good yields provided compounds are used as acylating agents which are derived from lower carboxylic acids. In the case of higher carboxylic acids, while uniform products also are obtained, the products to be separated by distillation are not very volatile, hence, require relatively long distilling times. However, even when distilling in vacuo, decomposition accompanied by discoloration readily occurs at the temperatures required.

OBJECTS OF THE INVENTION

The object of the present invention is a process for the manufacture of phosphonic acids or of phosphonates, respectively, having at least two phosphorus atoms in their molecules, from mixtures arrived at by the reaction of acylating compounds with phosphorous acid or of PCl₃ with water and carboxylic acids. The salient feature of the instant process consists in treating these mixtures with lower aliphatic alcohols and either distilling the volatile substances formed, also converting the acids into their salts in a manner known per se; or else separating the alcoholic layer after the addition of bases.

This and other objects of the invention will become more apparent as the description thereof proceeds.

DESCRIPTION OF THE INVENTION

It has now been discovered that uniform, phosphonic compounds selected from the group consisting of phosphonic acids having at least two carbon atoms and at least two phosphorus atoms in their molecule and salts of said acids can be obtained by the process of the invention. This invention consists essentially of the steps of acylating PCl₃ with an excess of acylating agents selected from the group consisting of aliphatic and aromatic carboxylic acids having at least two carbon atoms in their molecules in the presence of water or acylating phosphorous acid with an excess of acid chlorides or acid anhydrides of the above acids at elevated temperatures up to the reaction boiling point, cooling the reaction mixture to a temperature above 30°C and below the boiling point of the alcohol added and adding thereto an alcohol selected from the group consisting of methanol, ethanol, propanol, butanol and pentanol, said alcohol being added in amounts of from 1.1 to 20 times the stoichiometrical amount, calculated on said excess of acylating agent, maintaining the reaction mixture in the said temperature range for a time sufficient to form volatile components, and recovering said phosphonic compounds free from impurities.

As has been established, largely uniform and non-hygroscopic compounds are obtained by this method. These compounds formed have the formula (1)

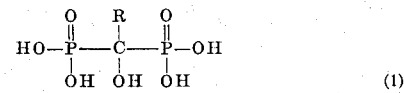

(1)

wherein R is an aryl- or alkyl radical having one carbon atom less than the carboxylic acid used in the reaction. As carboxylic acids aliphatic acids are preferred, and especially those having 2 to 18 carbon atoms. However, the use of aromatic acids is not precluded, and such have been used in the examples of this application.

The preferred alcohols for the treatment according to the invention are methanol and ethanol. However, propanols, butanols and pentanols may also be employed. In the manufacture of the phosphonic acid two mols acylating agent generally are used per mol phosphorous acid, as stated above. This is to be taken into consideration in the alcohol treatment inasmuch as a stoichiometrical excess of alcohol versus the excess of acylating agent used as starting material is to be used. This excess of alcohol should be 5 to 20 per cent.

In order not to increase the volume of the portions of the reaction mixture unnecessarily which later on are to be separated in form of a layer or as a distillate, it has been found opportune not to use more than five times, and preferably 1.1 to 3 times, the amount of alcohol over the stoichiometrical quantity calculated on the excess of acylating agent, however amounts up to 20 times may be employed.

It is indicated to carry out the alcohol treatment of the reaction mixture at elevated temperatures since this leads to better miscibility and, if a distillation follows the treatment, less heating is required. However, the alcohol treatment may be carried out at room temperature as well, if desired.

Preferably, after the acylation reaction between the PCl₃, water and carboxylic acids or phosphorous acid and carboxylic acid anhydrides or chlorides is completed at elevated temperatures up to the reaction boiling point, the reaction mixture is cooled to a temperature above 30°C, preferably above 50°C, and below the boiling point of the alcohol added. Thereafter, at this temperature, the alcohol selected from the group consisting of methanol, ethanol, propanols, butanols and pentanols is added in amounts of from 1.1 to 20 times the stoichiometric amount, calculated on the excess of acylating agent. A vigorous exothermic reaction then ensues and the temperature of the reaction mixture is maintained at the said temperature range of above 30°C, preferably above 50°C and below the boiling point of the alcohol by the boiling of the excess alcohol, for a time sufficient to form volatile components having a boiling point lower than that of the phosphonic acids produced as well as the carboxylic acid and carboxylic acid anhydride acylating agents. Thereafter, the phosphonic acids or phosphonates are recovered.

To obtain the free phosphonic acids, the reaction mixture, after the alcohol treatment, opportunely is refined by distilling all volatile components. These generally are removed more rapidly, more completely and at lower temperatures than by the separation of the free carboxylic acids after a treatment with water at elevated temperatures or by simply distilling the reaction mixture. The low distillation temperatures inherent in the alcohol treatment according to the invention largely avoid decomposition of the end product and impart to the same a light color. The phosphonic acids thus obtained can be converted into their salts in the conventional manner by neutralization with aqueous or alcoholic basic solutions, e.g., alkali solutions, ammonia, tetraalkylammonium hydroxide, and others. However, it is not necessary for the preparation of the phosphonates to first prepare the phosphonic acids in pure form and then to convert them to their salts. It has been established that the salts also are obtained in pure form when the mixture, treated with alcohol and cooled, is reacted with aqueous bases and the two layers formed are separated. The lower, aqueous layer contains the phosphonate. The quantity of bases to be added depends upon the desired degree of neutralization of the phosphonic acid present.

From the aqueous solutions thus obtained the solid salts can be manufactured by crystallization, spray drying or precipitation. However, the salts also can be produced initially be adding the bases in the form of alcoholic solutions. Bases suited for this process are especially sodium hydroxide, potassium hydroxide and also alcoholates. The salts thus are obtained in a solid and non-hygroscopic form.

The compounds manufactured according to the invention are good complex formers for metal ions, especially for polyvalent ions. Thus they are suited, for instance, for binding calcium ions in large measure so that they can well be employed for softening of water. It should be noted that for such purposes it is not necessary to use stoichiometrical quantities but that calcite precipitation can be greatly delayed by the use of substoichiometrical amounts. The compound according to the invention furthermore are capable of preventing the precipitation of heavy metal hydroxides, such as iron hydroxide.

The invention now will be further explained by the following examples. However, it should be understood that these are given merely by way of illustration and not of limitation, and that numerous changes may be made in the details without departing from the spirit and the scope of the invention as hereinafter claimed.

EXAMPLE 1

90 g acetic acid and 27 g water were mixed and 137 g $PCl_3$ added while holding the temperature of the reaction mixture between 30° and 40°C. The mixture was then allowed to boil under reflux, and the temperature thereafter raised slowly to 110°C. After stirring at 110°C for 2 hours, the mixture was cooled to 60°C, and 100 ml ethanol added. After thorough mixing, the volatile components were distilled and their last residues removed at a vacuum of 100 mm Hg. The distillation residue was crystallized under addition of a little water. The phosphonic acid thus obtained was practically free from acetic acid; its yield was 90 percent of theory.

EXAMPLE 2

50 kg $PCl_3$ were added with agitation to a mixture of 35 kg acetic acid and 9.2 kg water while holding the temperature of the reaction mixture between 30° and 40°C. The mixture then was agitated for 2 hours at 100°C. Thereafter the mixture was cooled below the boiling point of methanol, and 25 liters methanol added. The volatile components were distilled, the last residues in a vacuum of 100 mm Hg. The syrup remaining in the reactor was stirred with so much water that a 60 percent hydroxyethanediphosphonic acid formed. The acid was practically free from acetic acid. The yield was 59 kg, or 94.5 percent of theory.

To establish the capability of this compound to bind metal ions in a complex, the following tests were carried out:

5 ml water of a hardness of 20° are mixed with 1 ml 2% soda solution. A crystalline precipitation of calcium carbonate takes place immediately. However, when 0.25 mg of the compound obtained according to this example are added to 5 ml of the same kind of water, a slight turbidity occurs only after a considerable time. This turbidity gradually increases. When a larger quantity of the phosphonic acid is added, but still less than the stoichiometrical amount, precipitation of calcium carbonate can be avoided for several hours.

To a solution of 0.1 mmol $Fe^{3+}$ 15 ml of a solution were added containing 5 mmols $Na_2CO_3$ and 0.03 mmols hydroxyethanediphosphonic acid. The clear solution was heated to boiling. No precipitation of iron hydroxide and no turbidity occurred.

EXAMPLE 3

1,098 g $PCl_3$ were added with agitation to a mixture of 768 g acetic acid and 202 g water while keeping the temperature of the reaction mixture between 30° and 40°C. The mixture then was refluxed and thereafter the temperature increased slowly to 120°C. After stirring at 120°C for one hour, the mixture was cooled to 30°C, and 500 ml methanol added. After thorough mixing, the mixture was neutralized with 800 ml 40% aqueous NaOH, whereby two layers formed. The lower, aqueous layer was separated, and, after concentration, the sodium salt crystallized in a yield of 92 percent of theory.

EXAMPLE 4

90 g acetic acid and 27 g water were mixed at 30°–40°C with 137 g $PCl_3$ under agitation. The mixture then was refluxed and afterward the temperature allowed to rise gradually to 110°C. After stirring for 2 hours at 110°C, the mixture was cooled to 60°C, and 100 ml methanol added. After thorough mixing, neutralization was carried out with concentrated ammonia, whereby the ammonium salt precipitated in crystallized form. The yield was 82 percent of theory.

EXAMPLE 5

82 g phosphorous acid were heated slowly with 122 g acetic anhydride to 95°C and stirred at this temperature for 3 hours. After cooling to 50°C, 100 ml methanol were added. The heat of reaction was so great that the methanol boiled. After thorough mixing, the excess methanol and the volatile components were removed by distillation, the last residues in vacuo. The contents of the reactor then were crystallized under addition of a little water. The yield was 88 percent of the theory.

EXAMPLE 6

82 g phosphorous acid were refluxed with 118 g acetyl chloride, and the temperature raised gradually to 120°C. After stirring for 1 hour at that temperature, the mixture was cooled to 80°C, and 100 ml butanol added. After thorough mixing, all volatile components were distilled at a vacuum of 14 mm Hg up to a temperature of 100°C. The yield was 114 g 85% acid, or 94 percent of the theory.

EXAMPLE 7

345.5 g caproic acid were mixed with 54 g water, and 175 ml $PCl_3$ added at approximately 40°C. The mixture was heated for 5 hours at 140°C, cooled to 50°C, and 200 ml methanol added. After thorough mixing, the volatile components were distilled at a vacuum of 12 mm Hg. The residue was dissolved in 200 ml water, and the content of hydroxyhexanediphosphonic acid determined titrimetrically (55%, potentiometric titration with NaOH).

The yield was quantitative, and the solution contained less than 0.4 percent caproic acid.

EXAMPLE 8

517 g capric acid were mixed with 54 g water, and 175 ml $PCl_3$ added at approximately 50°C. The mixture then was heated at 140°–150°C for 5 hours. After cooling to 60°C, 200 ml ethanol were added and well mixed. The volatile ingredients then were distilled in a vacuum of 2 mm Hg at a sump temperature up to 140°C. The yield was 79.5 percent of theory.

EXAMPLE 9

769 g palmitic acid were melted under addition of 54 g water, and 175 ml $PCl_3$ added. This mixture was heated at 150°C for 5 hours, cooled to 70°C, and 200 ml ethanol added. After thorough mixing, the volatile ingredients were distilled in a vacuum of 1 mm Hg at a sump temperature up to 160°C. The yellow residue which solidified upon cooling was 400 g.

EXAMPLE 10

427 g stearic acid were melted under addition of 27 g water, and 87.5 ml $PCl_3$ added. The mixture was stirred for 20 hours at 160°C, cooled to 60°C, and 150 ml ethanol added. After thorough mixing, the volatile components were distilled at a vacuum of 0.1 mm Hg at a sump temperature up to 190°C. A brownish syrup remained which solidified upon cooling. The yield was 98.5 percent of the theory.

EXAMPLE 11

183 g benzoic acid and 27 g water were mixed, and 137 g $PCl_3$ added, whereby the temperature was kept between 40° and 50°C. The mixture then was heated with agitation to 140°C and kept at this temperature for 4 hours. After cooling to 65°C, 150 ml methanol were added and thoroughly mixed in. The volatile compounds were removed in vacuo. The yield was 95 percent of theory. A slight amount of free benzoic acid was present in the end product.

Equally good results were obtained in all examples by using corresponding amounts of propanol or a pentanol as the treating alcohol.

The preceding examples are illustrative of the practice of the invention. It is to be understood, however, that other expedients known to those skilled in the art or disclosed herein may be employed without departing from the spirit of the invention or the scope of the appended claims.

I claim:

1. A process for the manufacture of uniform, readily crystallizable phosphonic acids having at least two carbon and at least two phosphorus atoms in their molecules which consists of the steps of acylating $PCl_3$ with an excess up to 2 mols per mol of $PCl_3$ of acylating agents selected from the group consisting of alkanoic acids having two to 18 carbon atoms and benzoic acid in the presence of about 1½ mols of water per mol of $PCl_3$ at elevated temperatures up to the reaction boiling point, cooling the reaction mixture to a temperature from room temperature to below the boiling point of the alcohol added and adding thereto an alcohol selected from the group consisting of methanol and ethanol, said alcohol being added in amounts of from 1.1 to 20 times the stoichiometrical quantity, calculated on said excess of acylating agent, thoroughly mixing the reaction mixture while maintaining said temperature whereby volatile components having a lower boiling point than said acylating agent are formed, distilling said volatile components from said reaction mixture and recovering said phosphonic acids free from impurities.

2. A process for the manufacture of uniform, readily crystallizable phosphonic acid salts having at least two carbon and two phosphorus atoms in their molecules which consists of the steps of acylating $PCl_3$ with an excess up to 2 mols per mol of $PCl_3$ of acylating agents selected from the group consisting of alkanoic acids having two to 18 carbon atoms and benzoic acid in the presence of about 1½ mols of water per mol of $PCl_3$ at elevated temperatures up to the reaction boiling point, cooling the reaction mixture to a temperature from room temperature to below the boiling point of the alcohol added and adding thereto an alcohol selected from the group consisting of methanol and ethanol, said alcohol being added in amounts of from 1.1 to 3 times the stoichiometrical quantity, calculated on said excess of acylating agent, thoroughly mixing the reaction mixture while maintaining said temperature whereby volatile components having a lower boiling point than said acylating agent are formed, neutralizing said reaction mixture including volatile components with an aqueous basic solution, separating the organic layer containing volatile components from the aqueous layer and recovering said phosphonic compound from said aqueous layer as salts free from impurities.

* * * * *